(12) United States Patent
Hoshino et al.

(10) Patent No.: US 11,267,413 B2
(45) Date of Patent: Mar. 8, 2022

(54) MAINTENANCE COVER MEMBER

(71) Applicants: YAMASHITA RUBBER CO., LTD., Saitama (JP); HONDA MOTOR CO., LTD., Tokyo (JP)

(72) Inventors: Akira Hoshino, Fujimino (JP); Shuhei Kaneda, Fujimino (JP); Hideaki Sasaki, Wako (JP); Keizo Konishi, Wako (JP); Keisuke Katsumata, Wako (JP)

(73) Assignees: YAMASHITA RUBBER CO., LTD., Fujimino (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/086,804

(22) Filed: Nov. 2, 2020

(65) Prior Publication Data

US 2021/0138979 A1  May 13, 2021

(30) Foreign Application Priority Data

Nov. 8, 2019 (JP) .............................. JP2019-203501

(51) Int. Cl.
   *B60R 13/08*  (2006.01)
   *F02B 77/13*  (2006.01)
   *F02B 77/04*  (2006.01)

(52) U.S. Cl.
   CPC .......... *B60R 13/0861* (2013.01); *F02B 77/04* (2013.01); *F02B 77/13* (2013.01)

(58) Field of Classification Search
   CPC ...... B60R 13/0861; F02B 77/04; F02B 77/13; F02B 7/008
   See application file for complete search history.

(56) References Cited

U.S. PATENT DOCUMENTS

| 3,822,763 A | * | 7/1974 | Adams | F02F 7/006 |
| | | | | 181/204 |
| 5,397,206 A | * | 3/1995 | Sihon | F02B 77/005 |
| | | | | 411/369 |
| 2004/0188165 A1 | * | 9/2004 | Miller | F02F 7/008 |
| | | | | 180/291 |
| 2008/0093186 A1 | * | 4/2008 | Imai | F02B 77/13 |
| | | | | 188/379 |

FOREIGN PATENT DOCUMENTS

| JP | S63-45453 | 2/1988 |
| JP | H01-271609 | 10/1989 |
| JP | H04-237832 | 8/1992 |
| JP | 2014-040830 A | 3/2014 |

OTHER PUBLICATIONS

Japanese Office Action dated Aug. 24, 2021, English abstract included, 6 pages.

* cited by examiner

*Primary Examiner* — Syed O Hasan
(74) *Attorney, Agent, or Firm* — Rankin, Hill & Clark LLP

(57) ABSTRACT

There is provided a maintenance cover member including: a cover body for closing an opening of a power train of a vehicle; and a vibration suppressing member attached to a surface of the cover body. There is also provided a maintenance cover member including: a cover body for closing an opening of a power train of a vehicle; and a plurality of vibration suppressing members attached to a surface of the cover body. Adjacent vibration suppressing members are disposed spaced apart from each other.

9 Claims, 6 Drawing Sheets

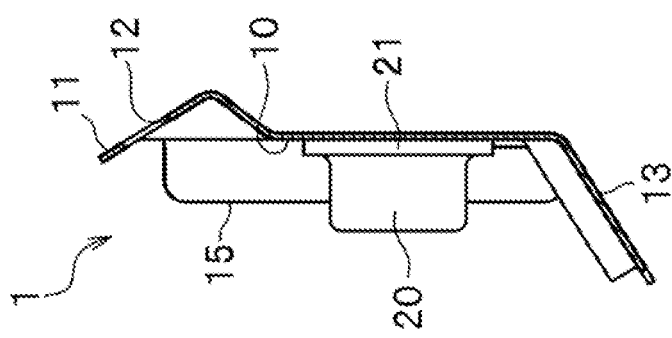
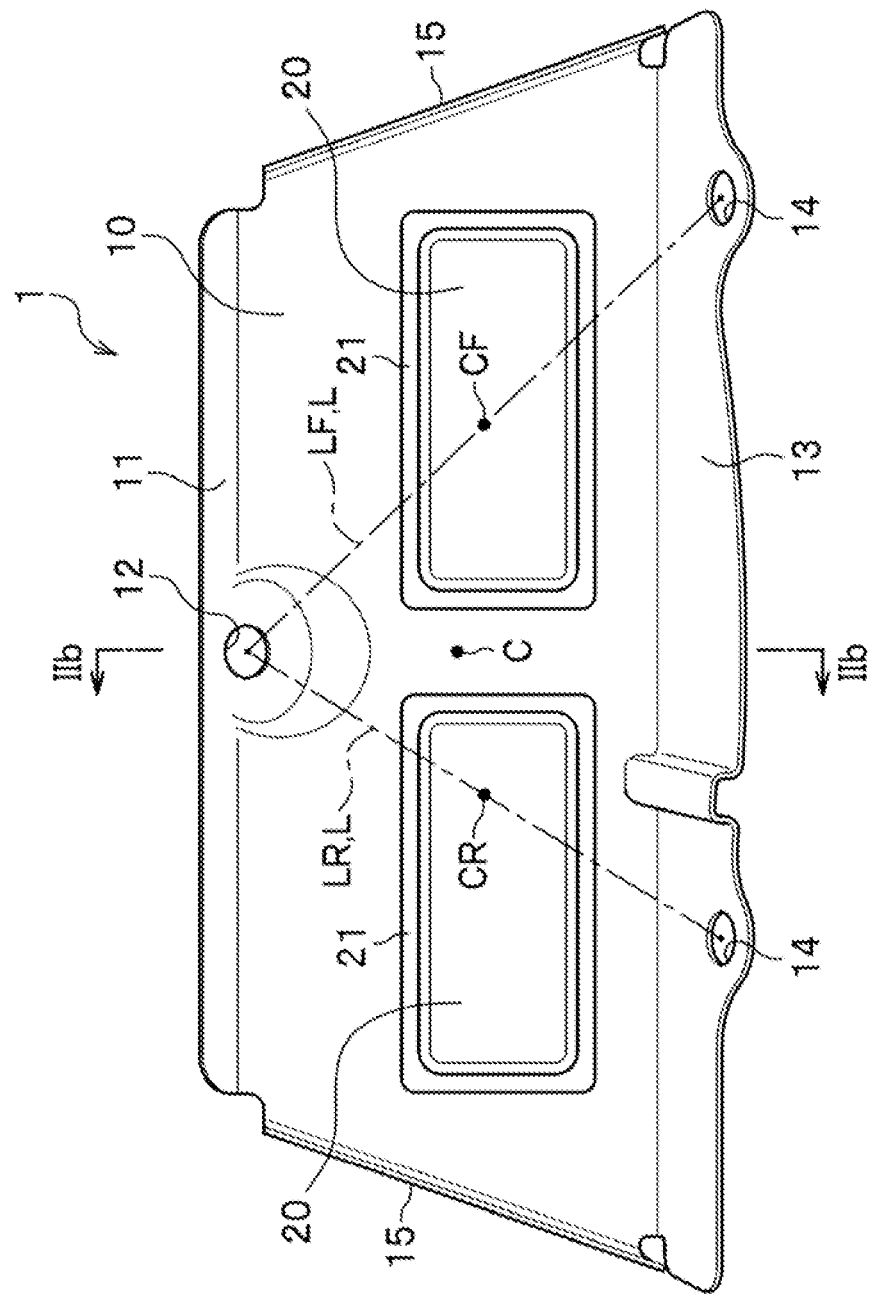

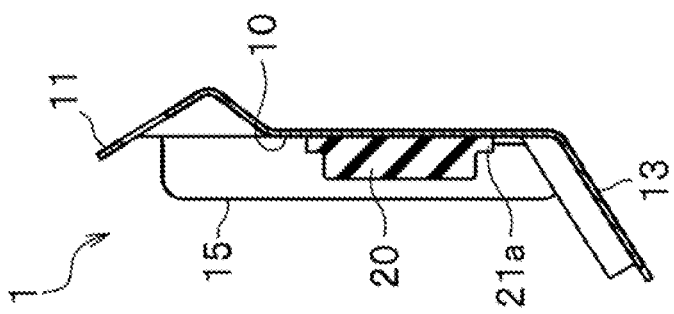
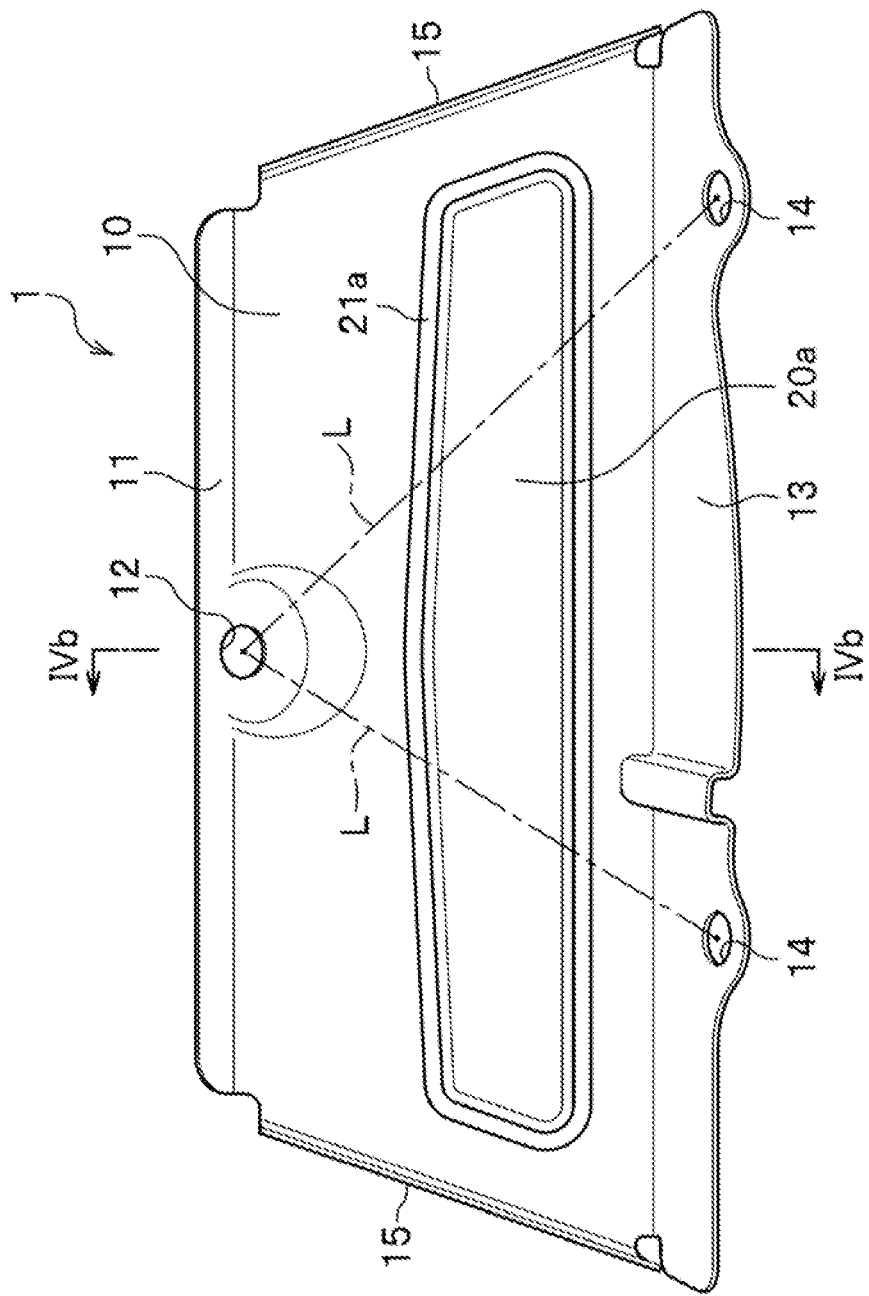

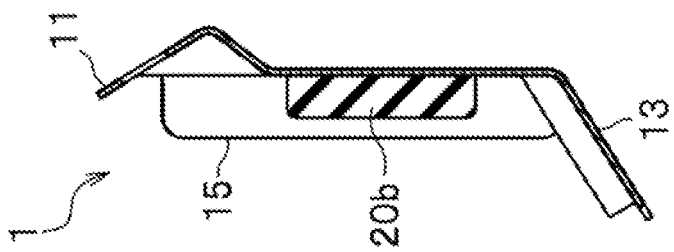
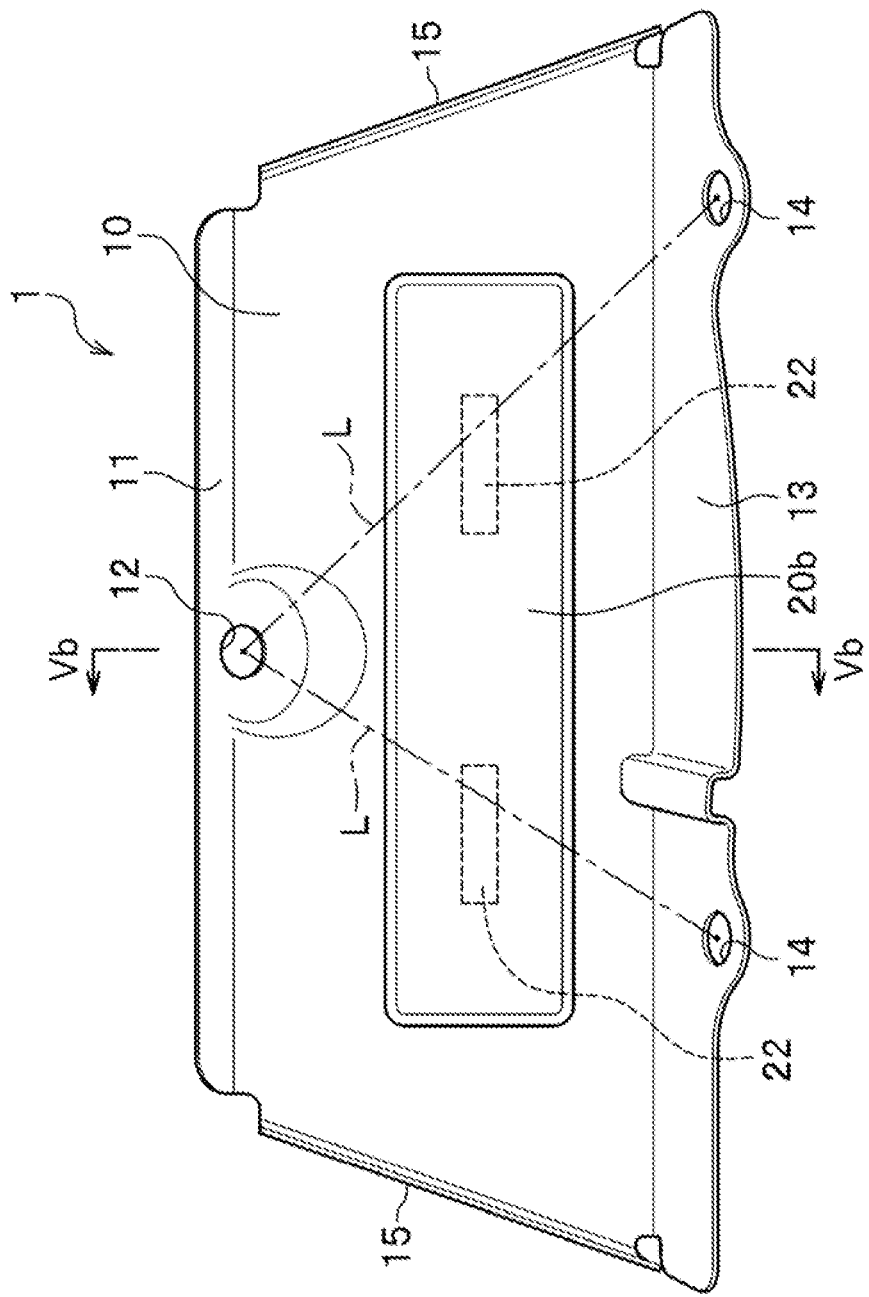

MAINTENANCE COVER MEMBER

CROSS-REFERENCE TO RELATED APPLICATION

This application claims the benefit of foreign priority to Japanese Patent Application No. 2019-203501, filed on Nov. 8, 2019, which is incorporated by reference in its entirety.

TECHNICAL FIELD

The present invention relates to a maintenance cover member.

BACKGROUND ART

To close a maintenance opening, a power train of a vehicle is often provided with a maintenance cover. For example, at a position under a flywheel disposed between an engine and a transmission of a vehicle, a maintenance cover for covering the flywheel is provided. The maintenance cover is supported to bridge between an oil pan disposed on a lower portion of the engine and a lower portion of the transmission. The maintenance cover is removed during maintenance work of the flywheel. The maintenance cover is a plate member made of metal, and is fixed to the transmission and the oil pan by fastening member such as bolts.

Such a structure for suppressing vibration of a cover to isolate noise is disclosed in JP 2014-40830 A (hereinafter referred to as Patent Literature Document 1). The noise isolation structure disclosed in Patent Literature Document 1 includes a connecting portion configured to surround a fastening member for attaching a cover body to an engine. The connecting portion includes a pair of fixing members and a pair of elastic members. The cover body is held between the pair of elastic members to suppress vibration of the cover body.

The noise isolation structure of Patent Literature Document 1 has a certain extent of noise isolation effect by suppressing vibration at the member for fixing the cover body to the engine. However, a radiated sound due to membrane surface resonance may be generated at the cover body when the engine vibrates. In recent years, quiet performance has been improved by hybridization of vehicles, and a further improved vibration suppression performance has been required.

In view of the above, it is an object of the present invention to provide a maintenance cover member having an improved vibration suppression performance.

SUMMARY

In one aspect, the present invention relates to a maintenance cover member comprising a cover body for closing an opening of a power train of a vehicle, and a vibration suppressing member attached to a surface of the cover body.

According to the maintenance cover member configured as described above, the vibration suppressing member can suppress vibration of the cover body, so that the vibration suppression performance can be improved. Therefore, the maintenance cover member according to the present invention has an improved vibration suppression performance and the radiated sound of the cover body due to membrane surface resonance can be suppressed.

It is preferable that the vibration suppressing member is a block-shaped rubber member vulcanized and bonded to the surface of the cover body. According to this configuration, the vibration suppressing member can be easily processed and the vibration suppression performance of the maintenance cover member can be improved further.

Further, it is preferable that the vibration suppressing member comprises a plurality of vibration suppressing members and that adjacent vibration suppressing members are disposed spaced apart from each other. According to this configuration, vibration can be efficiently suppressed because the vibration suppressing members are not affected from other vibration suppressing members.

Further, it is preferable that the cover body is fixed to a peripheral edge portion of the opening at a plurality of portions using fastening members and that the vibration suppressing member is disposed on an imaginary line connecting fixing positions at which the cover body is fixed to the peripheral edge portion of the opening. According to this configuration, vibration of the cover body can be efficiently suppressed.

Further, it is preferable that the opening is disposed between an oil pan provided on a lower portion of an engine and a transmission, that the cover body is fixed to the oil pan and the transmission through fastening members, and that the vibration suppressing member is disposed on an imaginary line connecting a fixing position at which the cover body is fixed to the oil pan and a fixing position at which the cover body is fixed to the transmission. This configuration can also suppress vibration of the cover body efficiently.

BRIEF DESCRIPTION OF THE DRAWINGS

The drawings described herein are for illustration purposes only and are not intended to limit the scope of the present invention in any way.

FIG. 2A is a bottom view of the maintenance cover member according to the first embodiment of the present invention.

FIG. 2B is a sectional view taken along the line IIb-IIb of FIG. 2A.

FIG. 4A is a bottom view of a maintenance cover member according to a second embodiment of the present invention.

FIG. 4B is a sectional view taken along the line IVb-IVIb of FIG. 4A.

FIG. 5A is a bottom view of a maintenance cover member according to a third embodiment of the present invention.

FIG. 5B is a sectional view taken along the line Vb-VIb of FIG. 5A.

DETAILED DESCRIPTION

A maintenance cover member according to the first embodiment of the present invention will be described below with reference to the accompanying drawing.

Figure 1:
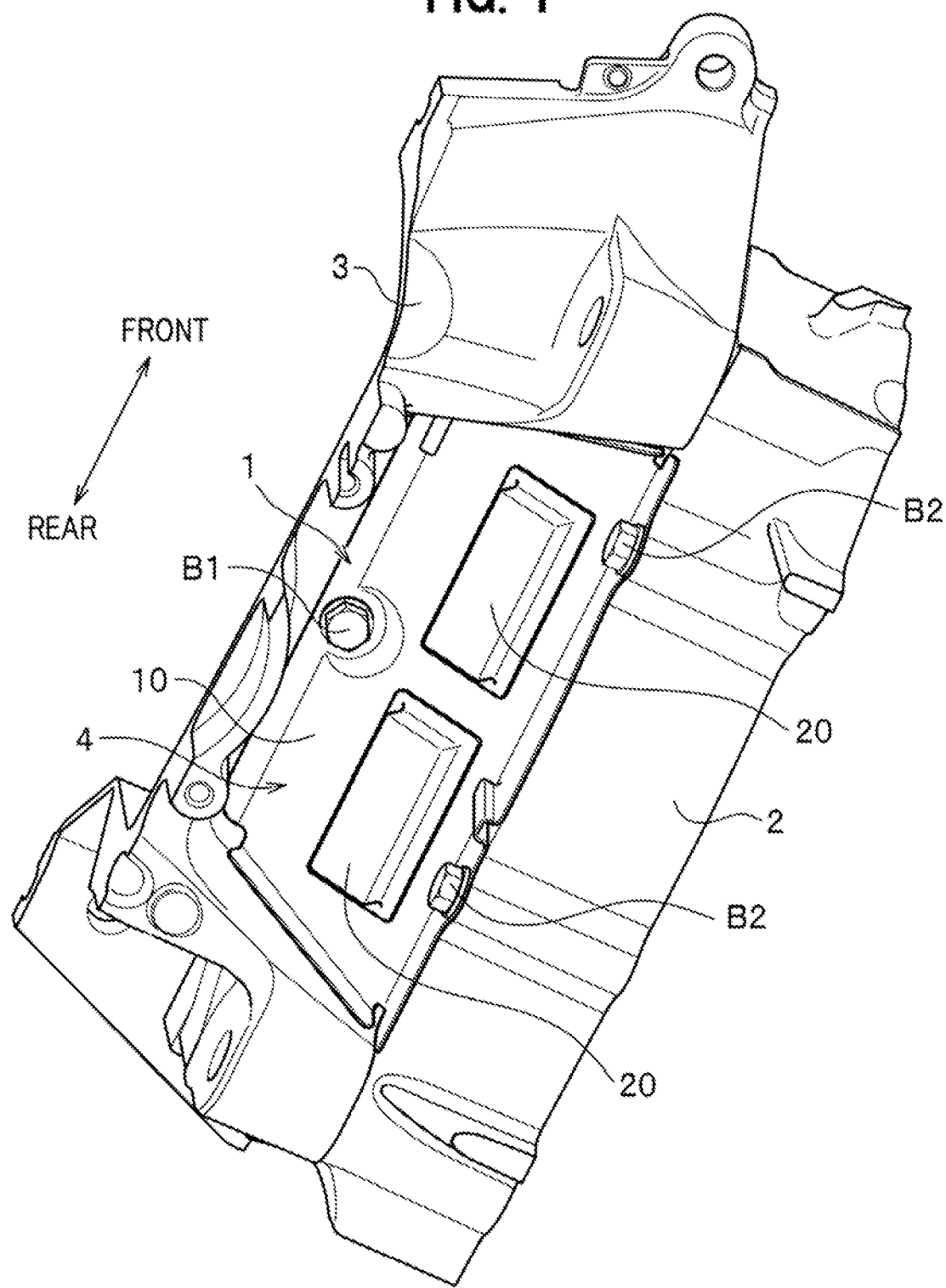
FIG. 1 is a perspective view of a maintenance cover member according to a first embodiment of the present invention, in which the maintenance cover member as installed is viewed from below.
Figure 3A:
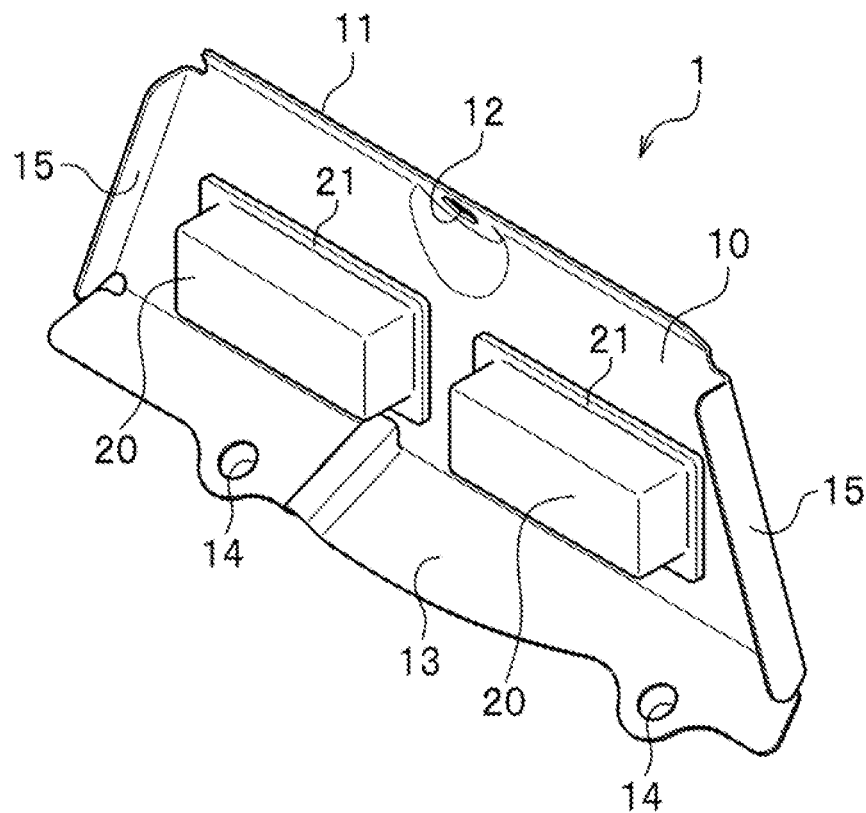
FIG. 3A is a perspective view showing a lower surface of the maintenance cover member according to the first embodiment of the present invention.
Figure 3B:
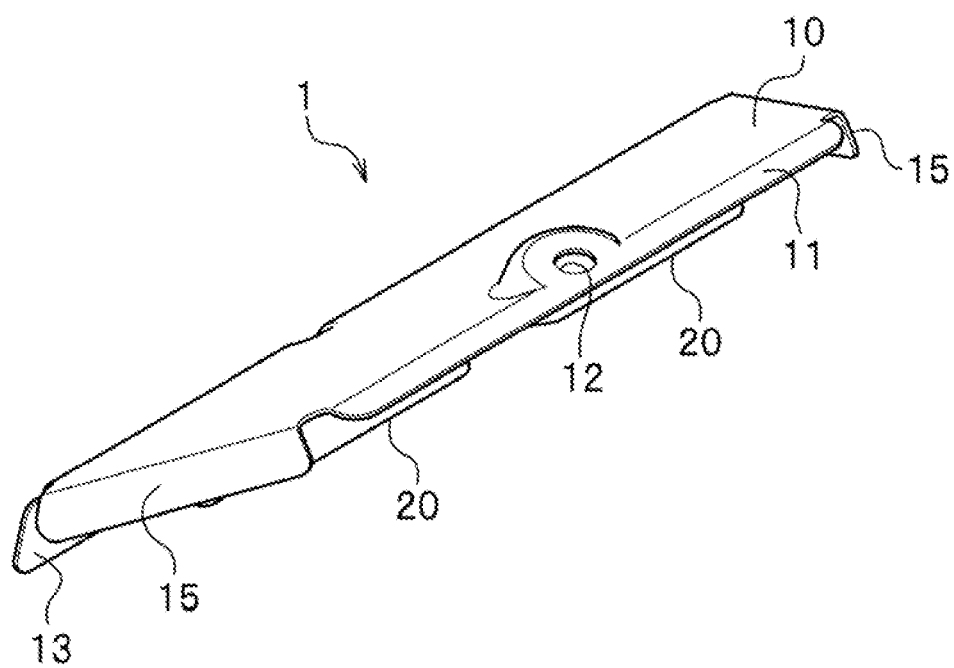
FIG. 3B is a perspective view showing an upper surface of the maintenance cover member according to the first embodiment of the present invention.

As seen in FIG. 1, a maintenance cover member 1 is used to close an opening 4 of a power train of a vehicle. The maintenance cover member 1 according to this embodiment covers a flywheel (not shown) disposed between an engine (not shown) and a transmission 2 from the lower side of the flywheel. An opening 4 is formed between an oil pan 3 disposed on a lower portion of the engine and the transmission 2, and the maintenance cover member 1 is detachably attached to a peripheral edge portion of the opening 4. The maintenance cover member 1 is removed during maintenance work of the flywheel. The maintenance cover member 1 includes a cover body 10 and vibration suppressing members 20.

As seen in FIGS. 2A and 2B and FIGS. 3A and 3B, the cover body 10 has a generally trapezoidal outer shape extending along the shape of the opening 4 (see FIG. 1). The cover body 10 is made of a sheet metal member for instance. The maintenance cover member 1 is positioned such that a short side portion and a long side portion of the outer peripheral portion of the cover body 10 are disposed along (parallel to) the longitudinal direction (front-rear direction) of the vehicle. It should be noted that the shape of the cover body 10 is not limited to the trapezoidal shape, but may be any shape extending along the opening 4.

A first rising portion 11 configured to contact an open wall surface (bottom surface of a peripheral edge portion of a recess portion formed on the oil pan 3) is formed on the short side portion of the outer peripheral portion of the cover body 10. The first rising portion 11 is formed by bending an end portion of the sheet metal member. When the maintenance cover member 1 is installed in position, the first rising portion 11 is kept substantially horizontal and contacts the bottom surface of the peripheral edge portion of the recess portion formed on the oil pan 3. An insertion hole 12 is formed in a longitudinal central portion of the first rising portion 11. A bolt B1 (fastening member) for fixing the maintenance cover member 1 to the oil pan 3 is inserted into the insertion hole 12.

A second rising portion 13 configured to contact an open wall surface (wall surface of the transmission 2 disposed opposite to the recess portion of the oil pan 3) is formed on the long side portion of the outer peripheral portion of the cover body 10. The second rising portion 13 is formed by bending an end portion of the sheet metal member. When the maintenance cover member 1 is installed in position, the second rising portion 13 is kept substantially vertical and contacts a side wall surface of the transmission 2 that defines the opening 4. Insertion holes 14 are formed in the second rising portion 13. A bolt B2 (fastening member) for fixing the maintenance cover member 1 to the transmission 2 is inserted into each insertion hole 14. The insertion holes 14 are formed at two positions (front portion and rear portion) spaced apart from each other in the longitudinal direction of the second rising portion 13.

The outer peripheral portion of the cover body 10 include a pair of oblique side portions opposite to and facing each other, and third rising portions 15 configured to contact open wall surfaces (front and rear wall surfaces of the recess portion formed on the oil pan 3) are formed on the pair of oblique side portions. The third rising portions 15 are formed by bending end portions of the sheet metal member. When the maintenance cover member 1 is installed in position around the opening 4, the third rising portions 15 are brought into contact with a front side wall surface and a rear side wall surface of the recess portion of the oil pan 3, respectively.

Vibration suppressing members 20 are bonded to an outer surface (lower surface) of the cover body 10. Each of the vibration suppressing members 20 is a block-shaped rubber member and is made, for example, of acrylic rubber (ACM).

The vibration suppressing member 20 has a generally rectangular parallelepiped shape with their corners chamfered in a curved shape. A flange portion 21 is formed on one surface of the vibration suppressing member 20. The flange portion 21 is provided to surround an attachment surface, through which the vibration suppressing member 20 is attached to the cover body 10. The attachment surface of the vibration suppressing member 20 and the surface of the flange portion 21 are flush with each other. The entire surface including the attachment surface of the vibration suppressing member 20 and the surface of the flange portion 21 is vulcanized and bonded to the cover body 10.

A plurality (two in this embodiment) of vibration suppressing members 20 are provided. According to this embodiment, two vibration suppressing members 20 are arranged such that they are spaced apart in the longitudinal direction (front-rear direction) of the vehicle with a center point C of the cover body 10 interposed therebetween. The vibration suppressing members 20 are arranged such that the longitudinal sides of the two rectangular parallelepipeds are parallel to (extend along) the second rising portion 13. The vibration suppressing members 20 are disposed on the imaginary lines L each connecting a fixing position (center of the insertion hole 12) at which the cover body 10 is fixed to the oil pan 3 and a fixing position (center of the insertion hole 14) at which the cover body 10 is fixed to the transmission 2. To be more specific, one (front) vibration suppressing member 20 is disposed on the imaginary line LF (referred to as "LF" when it is necessary to distinguish front and rear imaginary lines L) connecting the insertion hole 12 of the first rising portion 11 and one (front) of the two insertion holes 14 of the second rising portion 13. Further, the midpoint CF of the line segment LF is located in the position where the vibration suppressing member 20 is disposed on the cover body 10. The other (rear) vibration suppressing member 20 is disposed on the imaginary line LR (referred to as "LR" when it is necessary to distinguish front and rear imaginary lines L) connecting the insertion hole 12 of the first rising portion 11 and the other one (rear) of the two insertion holes 14 of the second rising portion 13. Further, the midpoint CR of the line segment LR is located in the position where the vibration suppressing member 20 is disposed on the cover body 10.

Hereinafter, a description will be given of frequency response analyses of the maintenance cover member 1 using FEM; the maintenance cover member 1 was modified by changing the shape of the vibration suppressing members 20. The frequency response analyses were conducted for a comparative example in which no vibration suppressing member was provided on the cover body, a first example (corresponding to the first embodiment) in which two vibration suppressing members 20 were provided on the cover body 10, a second example (corresponding to the second embodiment as shown in FIGS. 4A and 4B) in which one vibration suppressing member 20a was provided on the cover body 10, and a third example (corresponding to the third embodiment as shown in FIGS. 5A and 5B) in which one vibration suppressing member 20b was provided on the cover body 10 while bonding conditions were changed.

The cover body 10 used in the analyses is made of a sheet metal member having a thickness of 0.7-0.8 mm, and the shape of the cover body 10 is trapezoidal having a long side of 160 mm, a short side of 120 mm, and a height of 55 mm. The vibration suppressing members 20 of the first example (according to the first embodiment) are sized to have a longitudinal side length of 50 mm, a short side length of 25 mm, and a thickness of 12 mm.

As seen in FIGS. 4A and 4B, the vibration suppressing member 20a according to the second embodiment is formed of a single member. The vibration suppressing member 20a has a generally trapezoidal shape when viewed in a plan view and a central portion of the short side slightly bulges outward. A flange portion 21a is formed on the attachment surface side of the vibration suppressing member 20a. The entire surface including the attachment surface of the vibration suppressing member 20a and the surface of the flange portion 21a is vulcanized and bonded to the cover body 10, so that the vibration suppressing member 20a is mounted on the cover body 10. The vibration suppressing member 20a is sized to have a longitudinal side length of 132 mm, a height of 24 mm, and a thickness of 6 mm. Further, the vibration suppressing member 20a is disposed on the imaginary lines L connecting the fixing position at which the cover body 10 is fixed to the oil pan 3 and the fixing positions at which the cover body 10 is fixed to the transmission 2.

As seen in FIGS. 5A and 5B, the vibration suppressing member 20b according to the third embodiment is formed of a single member. The vibration suppressing member 20b has a rectangular shape when viewed in a plan view. The vibration suppressing member 20b is sized to have a longitudinal side length of 100 mm, a short side length of 25 mm, and a thickness of 6 mm. The vibration suppressing member 20b is mounted on the cover body 10 such that a part of the attachment surface, instead of the entire surface of the attachment surface, is vulcanized and bonded to the cover body 10. As seen in FIG. 5A, the vibration suppressing member 20b is fixed to the cover body 10 at two bonding areas 22. To be more specific, the two bonding areas 22 are located on the imaginary lines L connecting the fixing position at which the cover body 10 is fixed to the oil pan 3 and the fixing positions at which the cover body 10 is fixed to the transmission 2.

To obtain results similar to hammering test results obtained in an actual vehicle state in which a maintenance cover is fixed to the power train, frequency response analyses using FEM were conducted under the following constraint condition. Fastening portions of the maintenance cover 1 were rigidly connected to a model partly including an oil pan 3 and a transmission 2, and the rising portions 11, 13, 15 in contact with wall portions of the opening were connected to allow a relative displacement. The oil pan 3 and the transmission 2 were set in a rigidly connected state around the opening. It should be noted that the actual vehicle state could not always be reproduced by this constraint condition, and therefore values indicating the effect of reduction are not so significantly important. Accordingly, the results are considered as qualitative effects.

Figure 6:
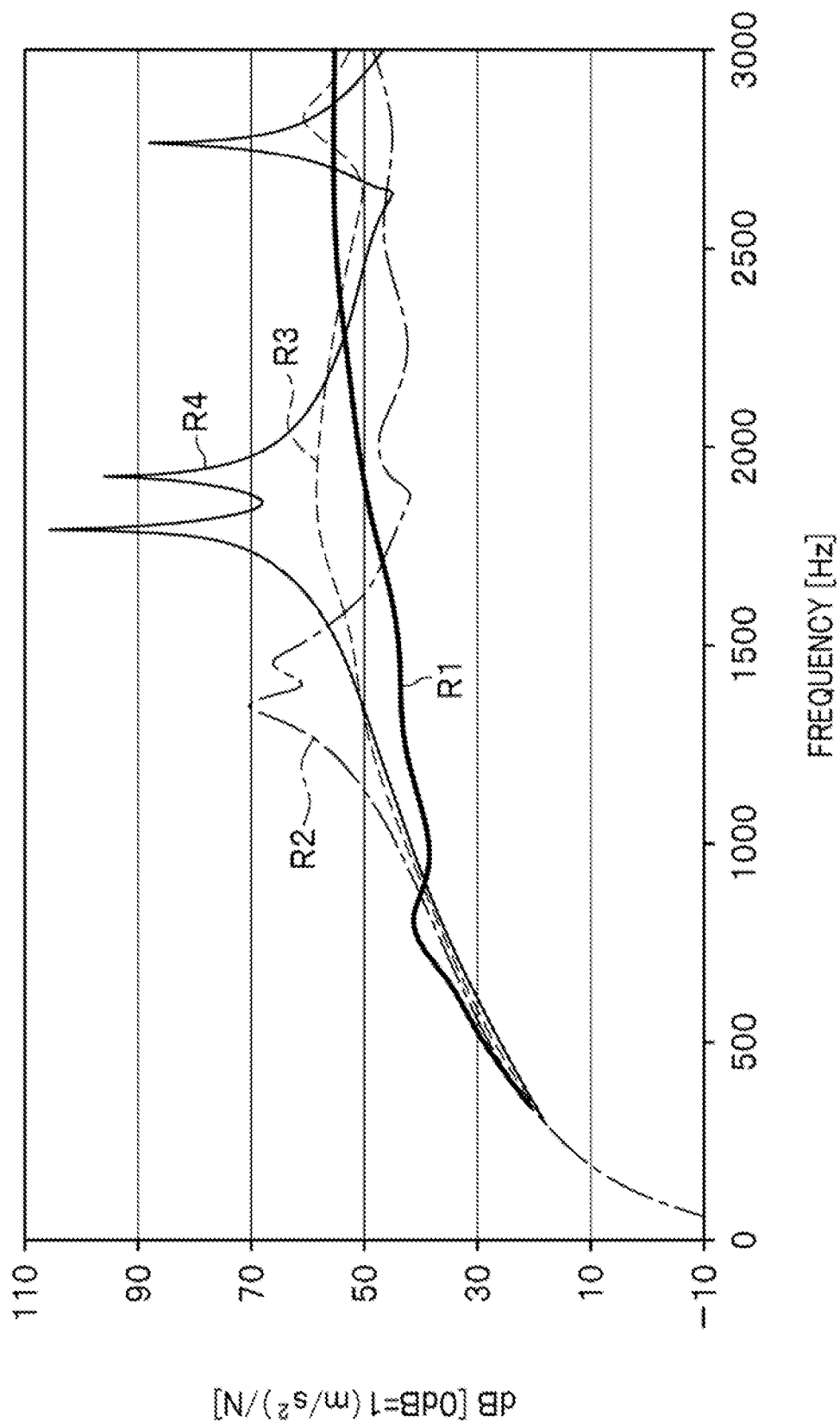
FIG. 6 is a graph showing results of frequency response analyses of maintenance cover members.

FIG. 6 shows the analyses results. As shown in FIG. 6, the analysis result (R4) for the maintenance cover without providing a vibration suppressing member according to the comparative example shows that large noise is generated in a frequency range of 1,700 Hz to 2,000 Hz and in a frequency range of 2,600 Hz to 2,900 Hz. In particular, the frequency range of 1,700 Hz to 2,000 Hz is a major problem. In contrast, the analysis result (R2) for the maintenance cover member according to the second example in which the vibration suppressing member 20a formed of a single member is bonded at the entire surface thereof to the cover body 10 shows that the peak of the noise is significantly reduced as compared with that of the comparative example. Similarly, the analysis result (R3) for the maintenance cover member according to the third example in which the vibration suppressing member 20b formed of a single member is bonded to the cover body 10 at two bonding areas 22 shows that noise is reduced as a whole. The analysis result (R1) for the maintenance cover member according to the first example in which two vibration suppressing members 20 are provided shows that a peak of noise is not generated and noise is reduced as a whole. According to the first example, the noise in the frequency range of 1,700 Hz to 2,000 Hz, at which the peak of noise in question is generated in the comparative example, is smaller than that of the third example, so that a stable noise reduction effect can be obtained.

As is clear from the above, it is found in the first, second and third examples that providing the vibration suppressing members 20, 20a, 20b on the cover body 10 at positions corresponding to antinodes of the amplitude makes it possible to suppress vibration and thus to reduce the noise. Namely, providing the vibration suppressing members 20, 20a, 20b on the cover body 10 can improve the vibration suppression performance.

Further, it is more preferable that the vibration suppressing member(s) is bonded to the cover body at a plurality of bonding areas (two bonding areas) as described in the first example and the third example. In particular, according to the first example, the entire surface of the attachment surface of the vibration suppressing members 20 is bonded to the cover body 10, so that a bonding operation is performed with ease as compared with a bonding operation of the third example in which the bonding areas 22 are provided partly on the attachment surface of the vibration suppressing member 20b. Therefore, it is further preferable that the vibration suppressing member 20 is divided into a plurality of vibration suppressing members 20 as described in the first embodiment and that each of the plurality of vibration suppressing members 20 is bonded by the entire surface of the attachment surface.

It should be noted that the larger the thickness of the vibration suppressing member 20, 20a, 20b is, the more the vibration suppression performance is improved. However, in consideration of a minimum ground clearance of a vehicle (i.e., minimum distance from the road surface to the lower end of the vehicle body), the thickness of the vibration suppressing member 20, 20a, 20b is preferably 12 mm. The thickness of the vibration suppressing member 20, 20a, 20b may be increased if it is applied to a vehicle with a higher minimum ground clearance.

As described above, the maintenance cover member 1 according to the present invention can suppress vibration of the cover body 10 by the use of the vibration suppressing members 20 (20a, 20b), so that the vibration suppression performance is enhanced. This can suppress an occurrence of a radiated sound from the cover body 10 due to membrane surface resonance. Further, the vibration suppressing member 20 can be easily processed because it is formed of a block-shaped rubber member. The vibration suppressing member 20 is vulcanized and bonded to the surface (lower surface) of the cover body 10, so that an enhanced anchorage strength and thus a further enhanced vibration suppression performance can be provided.

According to the first embodiment, two vibration suppressing members 20 are provided, and adjacent vibration suppressing members 20 are disposed spaced apart from each other. This configuration makes it possible to efficiently suppress vibration because the plurality of vibration suppressing members 20 are not affected from other vibration suppressing members 20.

Further, each of the vibration suppressing members 20 is disposed on the imaginary line L connecting the fixing position at which the cover body 10 is fixed to the oil pan 3 and the fixing position at which the cover body 10 is fixed to the transmission 2. This configuration can suppress vibration of the cover body 10 efficiently because the vibration suppressing member 20 can hold a center portion of vibration of the cover body 10.

Although the embodiments of the present invention have been described above, the present invention is not limited to the above-described embodiments and various changes and modifications may be made, where appropriate, without departing from the scope of the present invention. For example, the vibration suppressing member 20 according to the first embodiment has a rectangular parallelepiped shape. However, the shape of the vibration suppressing member is not limited to this specific shape, and other shapes such as a circular cylinder, a truncated cone, and a rectangular pyramid may be employed. Further, the number of vibration suppressing members 20 is not limited to two, and one vibration suppressing member 20 or more than two vibration suppressing members 20 may be employed.

Further, the vibration suppressing members 20 according to the first embodiment are vulcanized and bonded to the cover member 10. However, the manner of fixing the vibration suppressing members 20 to the cover body 10 is not limited to the vulcanized adhesion. Other adhesion method using a double-sided tape, adhesive or the like may be employed as long as an enhanced anchorage strength can be obtained.

Further, according to the first embodiment, the vibration suppressing members 20 are attached to the outer surface of the cover body 10. However, the vibration suppressing members 20 may be adhered to the inner surface of the cover body 10.

What is claimed is:

1. A maintenance cover member used to close an opening of a power train of a vehicle, the maintenance cover member comprising:
    a cover body for closing the opening disposed between an oil pan and a transmission of the vehicle; and
    a vibration suppressing member attached to a surface of the cover body,
    wherein the cover body has a first edge portion fixed to the oil pan and a second edge portion opposite to the first edge portion and fixed to the transmission, and the cover body is fixed to a peripheral edge portion of the opening using fastening members such that one fixing position and a plurality of fixing positions opposite to the one fixing position are arranged on the first edge portion and the second edge portion, and
    wherein the vibration suppressing member is a block-shaped rubber member and is disposed on imaginary lines connecting the one fixing position and the plurality of fixing positions.

2. The maintenance cover member according to claim 1, wherein the vibration suppressing member is vulcanized and bonded to the surface of the cover body.

3. The maintenance cover member according to claim 1, wherein the vibration suppressing member comprises a plurality of vibration suppressing members, and
    wherein adjacent vibration suppressing members are disposed spaced apart from each other, and each of the vibration suppressing members is disposed on one of the imaginary lines that connects the one fixing position and one of the plurality of fixing positions.

4. The maintenance cover member according to claim 1, wherein the vibration suppressing member is disposed on midpoints of the imaginary lines.

5. The maintenance cover member according to claim 1, wherein the fastening members are bolts inserted through bolt holes formed in the first edge portion and the second edge portion.

6. A maintenance cover member used to close an opening of a power train of a vehicle, the maintenance cover member comprising:
    a cover body for closing the opening disposed between an oil pan and a transmission of the vehicle; and
    a plurality of vibration suppressing members attached to a surface of the cover body,
    wherein adjacent vibration suppressing members are disposed spaced apart from each other,
    wherein the cover body has a first edge portion fixed to the oil pan and a second edge portion opposite to the first edge portion and fixed to the transmission, and the cover body is fixed to a peripheral edge portion of the opening using fastening members such that one fixing position and a plurality of fixing positions opposite to the one fixing position are arranged on the first edge portion and the second edge portion, and
    wherein each of the vibration suppressing members is disposed on an imaginary line connecting the one fixing position and one of the plurality of fixing positions.

7. The maintenance cover member according to claim 6, wherein each of the vibration suppressing members is a block-shaped rubber member vulcanized and bonded to the surface of the cover body.

8. The maintenance cover member according to claim 6, wherein the plurality of vibration suppressing members are disposed on midpoints of the imaginary lines.

9. The maintenance cover member according to claim 6, wherein the fastening members are bolts inserted through bolt holes formed in the first edge portion and the second edge portion.

* * * * *